United States Patent
Knutson et al.

(10) Patent No.: US 6,842,905 B2
(45) Date of Patent: Jan. 11, 2005

(54) METHOD AND SYSTEM FOR IMPLEMENTING COLLECTION PROGRAM INTERFACE FOR ACCESSING A COLLECTION OF DATA ASSOCIATED WITH A LEGACY ENUMERATION APPLICATION INTERFACE

(75) Inventors: James I. Knutson, Austin, TX (US); Gregory L. Truty, Austin, TX (US); James L. Van Oosten, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 09/821,109

(22) Filed: Mar. 29, 2001

(65) Prior Publication Data

US 2002/0144018 A1 Oct. 3, 2002

(51) Int. Cl.[7] .................................................. G06F 9/00

(52) U.S. Cl. ........................ 719/328; 719/329; 717/116; 717/118; 717/146; 717/147

(58) Field of Search ................................. 719/328, 329; 717/116, 118, 146, 147; 709/310–338

(56) References Cited

U.S. PATENT DOCUMENTS

| 6,128,590 A | 10/2000 | Stadel et al. |
| 6,151,608 A | 11/2000 | Abrams |
| 6,161,219 A | 12/2000 | Ramkumar et al. |
| 6,305,007 B1 * | 10/2001 | Mintz .......................... 717/116 |
| 6,332,163 B1 * | 12/2001 | Bowman-Amuah ......... 709/231 |

* cited by examiner

*Primary Examiner*—Nabil El-Hady
(74) *Attorney, Agent, or Firm*—Cardinal Law Group; David A. Mims, Jr.

(57) ABSTRACT

A software wrapper for interfacing to pre-existing software code is provided. The software wrapper is capable of inheriting from a first application program interface (API) and a second API. For calls to the first API, the software wrapper delegates to a pre-existing enumeration of objects. The wrapper creates a vector identifying elements of the enumeration. Iterators provided by the wrapper maintain positional cursors for calls to the second API. A comparison is made between each of the positional cursors and the vector. If a positional cursor exceeds the size of the vector, additional elements are extracted from the enumeration, placed in the vector, and returned on the second API. Otherwise, if the positional cursor is smaller than the vector size, the wrapper delegates directly to the vector. The first API can be a java-based enumeration API and the second API can be a java-based collection API.

20 Claims, 3 Drawing Sheets

METHOD AND SYSTEM FOR IMPLEMENTING COLLECTION PROGRAM INTERFACE FOR ACCESSING A COLLECTION OF DATA ASSOCIATED WITH A LEGACY ENUMERATION APPLICATION INTERFACE

TECHNICAL FIELD OF THE INVENTION

The present invention relates generally to software reuse, and in particular, to a method and system for upgrading existing software code in an object-oriented environment.

BACKGROUND OF THE INVENTION

Programming language standards often change as programming languages evolve. Although the evolution of a particular programming language may provide significant benefits to a user community, through improved ease of use and greater functionality, for example, the changes to the language may also present problems of incompatibility between earlier developed software and latter-developed software, where the latter-developed software has been written using a newer version of the language. These incompatibility problems can cause existing software code to be unusable or of limited use in developing new applications.

In such situations, pre-existing software code can be re-written or modified to be compatible with newer versions of a programming language. The modified code can then be reused in the new applications. However, this approach of re-writing existing code is often expensive and time consuming. In order to improve software development productivity, an alternative approach to software reuse is needed.

An example of an evolving programming language is Java™, developed by Sun Microsystems, Inc. Java™ is a popular object-oriented programming language. The Java 2 Enterprise Edition (J2EE) standards are evolving quickly, and therefore, there is a need for a technique to conveniently migrate existing Java™ code from older implementations to support the new language specifications.

SUMMARY OF THE INVENTION

In view of the foregoing, the present invention provides a method and system for rapid implementation of similar software functions, where one function or application program interface (API), has been deprecated in favor of another, but can not be entirely replaced due to legacy considerations. An advantage of the invention is that it permits software components to be conveniently reused without rewriting of the components. This results in more productive software development.

According to one embodiment of the invention, a software wrapper is provided for interfacing to pre-existing object-oriented software code. The software wrapper is capable of inheriting from a first API and a second API. The first API can be a deprecated API and the second API can be a similar function designed to replace the first API, but runs side by side with the first API while legacy code is migrated to the second API.

For calls to the first API, the software wrapper delegates to a pre-existing enumeration of objects. The wrapper creates a vector identifying elements of the enumeration. Iterators provided by the wrapper maintain positional cursors for calls to the second API. A comparison is made between each of the positional cursors and the vector. If a positional cursor exceeds the size of the vector, additional elements are extracted from the enumeration, placed in the vector, and returned on the second API. Otherwise, if the positional cursor is smaller than the vector size, the wrapper delegates directly to the vector. The first API can be a Java-based enumeration API and the second API can be a Java-based collection API.

DETAILED DESCRIPTION OF THE PRESENTLY PREFERRED EMBODIMENTS

The functions and operation of the present invention are described in detail using the Java™ programming language as an example. The techniques and methods of the invention disclosed herein are applicable to other programming languages, and are not limited to use only with software code written in Java™.

Figure 1:
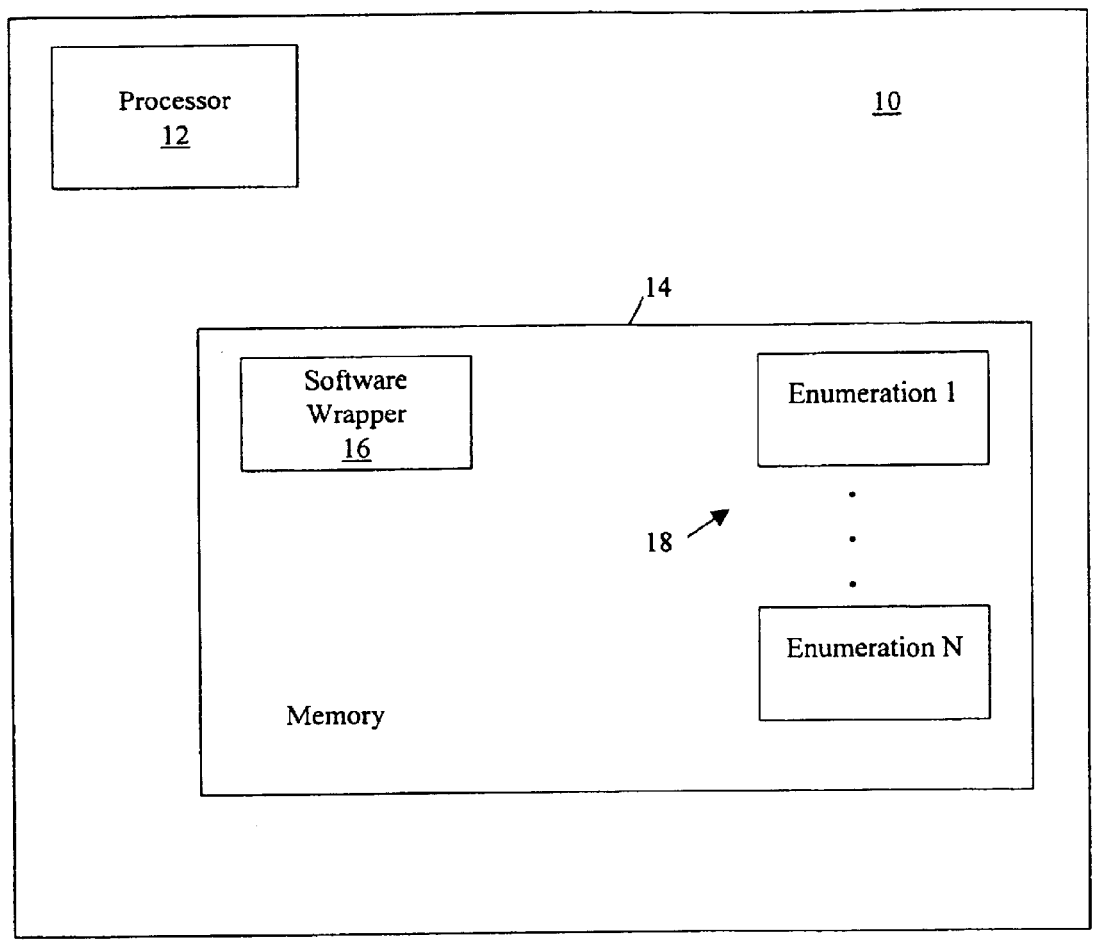
FIG. 1 is a block diagram of an exemplary system in accordance with the present invention.

Turning now to the drawings, and in particular to FIG. 1, there is illustrated a block diagram of an exemplary system 10 in accordance with the present invention. The system 10 can be any suitable computing device, such as a commercially-available workstation or server running a conventional operating system, having a processor 12, such as a microprocessor, for executing software programs and a memory 14 for storing the software program and data usable by the processor 12.

In accordance with the invention, the memory stores a software wrapper 16 and one or more enumerations 18. The enumerations can be pre-existing software defining services available to application programs (not shown) executed by the processor 12. The software wrapper 16 is a program that provides at least one programmatic interface to the enumerations 18, allowing the applications to utilize resources provided by the enumerations.

As the programming languages of the applications evolve and change, the software wrapper 16 can be configured to account for these changes and provide appropriate interfaces to the underlying enumerations 18. This permits existing enumerations 18 to be reused with newer applications without having to modify the enumeration code.

Figure 2:
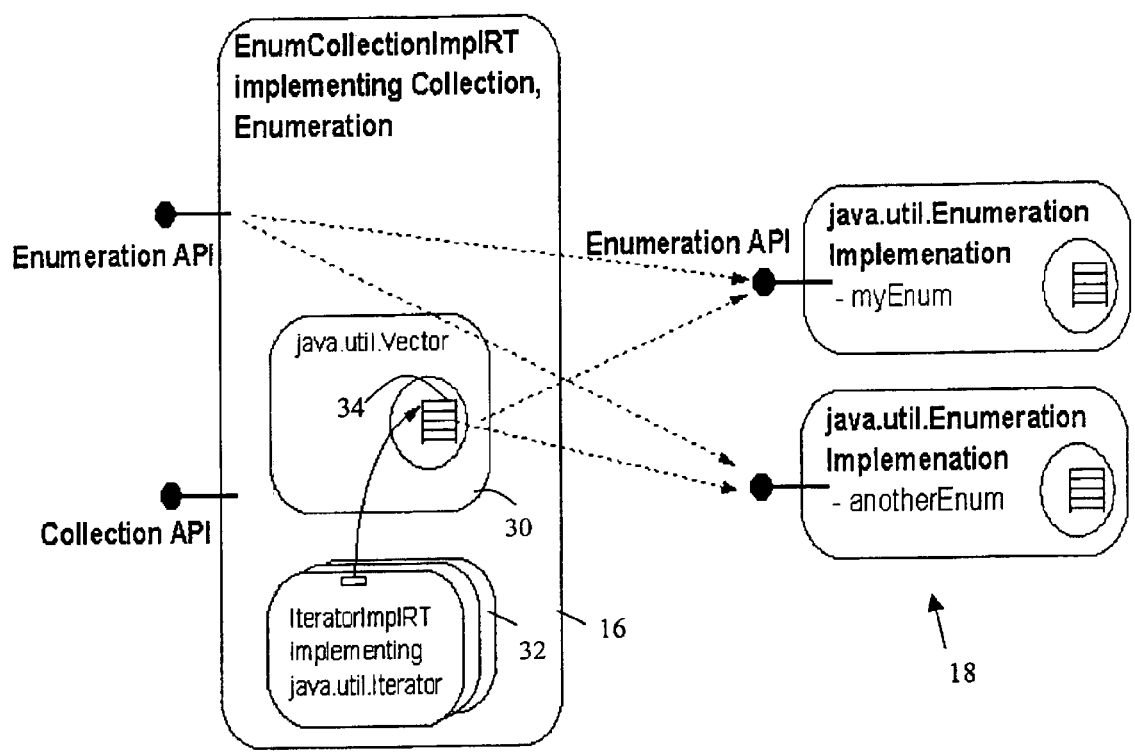
FIG. 2 is a detailed block diagram of exemplary software stored in the computer memory shown in FIG. 1.

A specific example of the software wrapper 16 and enumerations 18 for the Java™ programming language is shown in FIG. 2. The wrapper implementation 16 provides an enumeration application program interface (API) and a collection API to software applications using the underlying enumerations 18. More specifically, the enumeration API can be the java.util.Enumeration API and the collection API can be the java.util.Collection API. The Enterprise Java Beans (EJB) 1.1 specification has deprecated use of the java.util.Enumeration API in favor of the java.util.Collection API.

The wrapper 16 implements a vector 34 using the java.util.Vector 30 for caching elements returned on the enumeration APIs of the underlying enumerations 18. One or more iterators 32 are provided by the wrapper 16 for providing positional cursors into the vector 34 for calls on the collection API.

Figure 3:
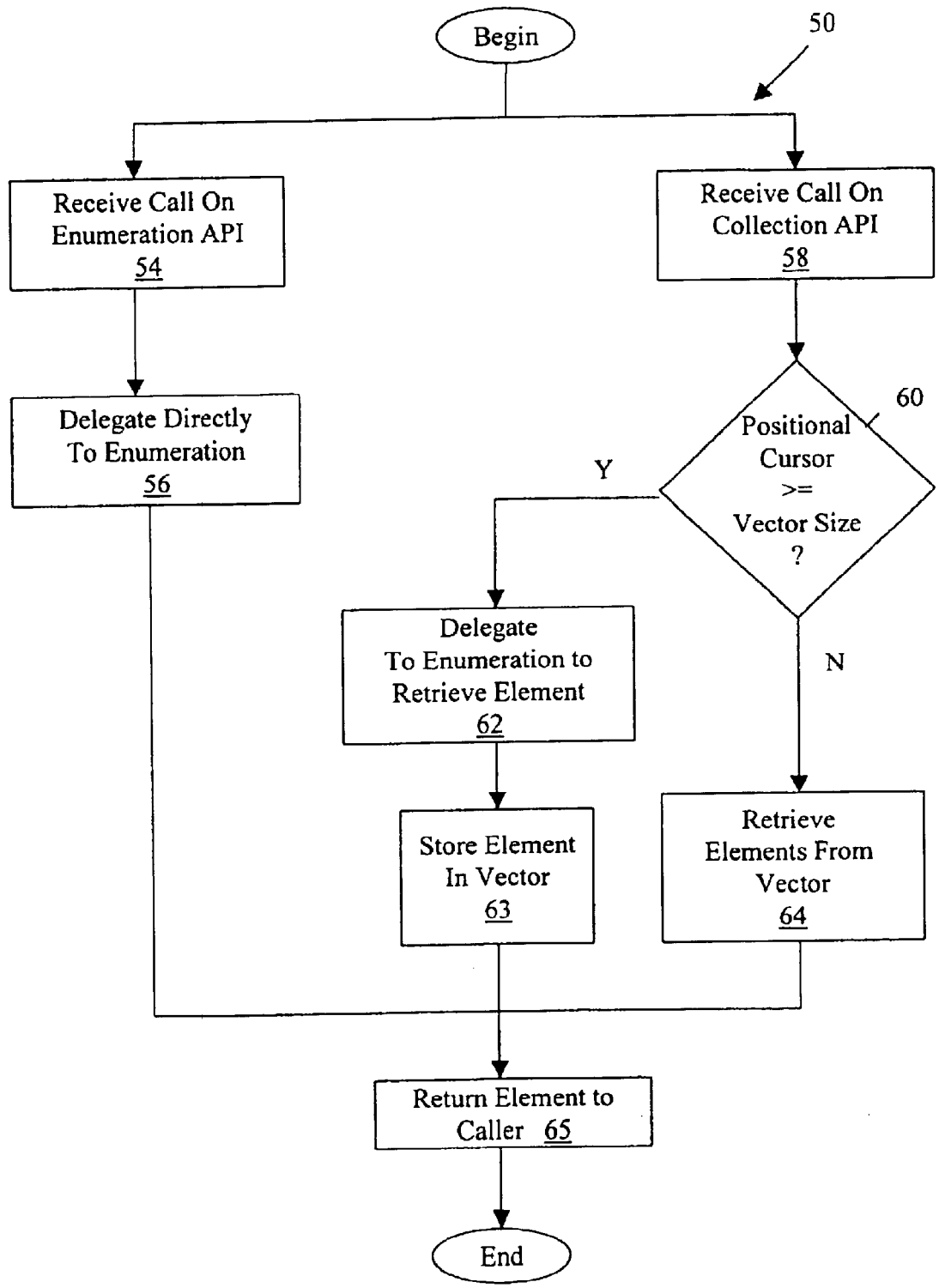
FIG. 3 is a flow chart illustrating the operation of the software wrapper of FIGS. 1–2, in accordance with the present invention.

FIG. 3 shows a flow chart 50 describing the operation of the wrapper 16. The wrapper implementation 16 implements both the collection and enumeration APIs. When the wrapper 16 receives a call on the enumeration API, (Step 54), it delegates directly to the existing enumeration implementation class instance. In the enumeration interface methods, the implementation 16 delegates to the original implementation.

If a call is received on the collection API (step 58), a positional cursor is maintained for the call by a corresponding iterator 32. In the collections interface methods, the methods for this interface take the enumeration that is handed to it and create the vector 34 to hold the returned results from the underlying enumeration. The iterator 32 to the collection will maintain a positional cursor to the vector. If the positional cursor in the iterator 32 is greater than or equal to the size of the vector 34, the implementation 16 delegates to the enumeration, i.e., a call is made on the underlying enumeration 18 to extract the next element (step 62). The element is then stored in the vector 34 and then returned to the caller on the collection API (step 65).

If the positional cursor is less than the size of the vector, the requested element is retrieved from the vector 34 (step 64), and then returned to the caller (step 65).

If another iterator 32 is pulled from the collection, it will start with using the already retrieved items in the vector 34 prior to attempting to retrieve items from the underlying enumeration 18. The methods to get the next element from the underlying enumeration 18 are synchronized to prevent multiple clients of the wrapped implementation 16 from retrieving the next request simultaneously.

The collection returned can be non-modifiable, i.e., its usage will be more for iterating through the collection.

In the example shown in FIG. 2, there is one implementation of the wrappered class (EnumCollectionImpIRT), which implements both the java.util.Collection and java.util.Enumeration APIs. This implementation holds the vector 34 of elements retrieved from the underlying enumeration (the enumeration providing the initial functionality). There may be different types of enumerations with different qualities of service (shown as myEnum and anotherEnum). The implementation 16 also contains multiple iterator implementations (IteratorImpIRT) which hold positional cursors into the vector 34. As needed, the EnumCollectionImpIRT may retrieve items from the underlying enumerations 18, placing them in the internal vector 34 to be iterated against by the iterators 32.

In the runtime, one instance of the EnumCollectionImpIRT can exist for each instance of the underlying enumerations. Within each instance of the EnumCollectionImpIRT, there will be a vector holding the already retrieved state from the underlying enumeration. Multiple iterator instances may be created each maintaining a positional cursor into the internal vector.

1.0 Java Objects

A collection (sometimes called a container) is simply an object that groups multiple elements into a single unit. Collections are used to store, retrieve and manipulate data, and to transmit data from one method to another. Collections typically represent data items that form a natural group, like a poker hand (a collection of cards), a mail folder (a collection of letters), or a telephone directory (a collection of name-to-phone-number mappings).

The collection API includes a framework, which is a unified architecture for representing and manipulating collections of objects independent of their representation details. Collections enable interoperability between unrelated APIs, encourage software reuse, and make it easier to design or implement a new API.

The logic for each of the collection methods is documented below:

add—adds an element to the Collection.

addAll—adds a collection to the Collection.

clear—removes element from collection. This method relies on the iterator's implementation.

contains—returns true if collection contains this element. The implementation will traverse the enumeration looking for a matching element. If found, it will return a true.

containsAll—returns true if collection contains all the elements in the collection passed in. The implementation will traverse the enumeration checking to see if the collection passed in is contained within the collection.

isEmpty—returns true if collection contains no elements. The implementation checks for a null vector and an enumeration that doesn't have any more elements.

iterator—returns an implementation of a iterator which holds positional cursor into the Collection's internal vector.

remove—removes an object from the collection.

removeAll—removes all elements in the collection passed in from the underlying collection. This is based on an implementation of remove.

retainAll—retains only the elements in the collection passed in.

size—returns the size of the collection. The implementation will drain the enumeration and return the size of the vector.

toArray—returns an array of all the elements of the Collection. The implementation will drain the enumeration into the vector, and the vector will eventually hand back an array of elements.

toArray—returns an array of all the elements of the Collection (but allows a casting to the type passed in). The implementation drains the enumeration, then loops through the vector issuing a PortableRemoteObject.narrow (of the type passed in), and then returns the array of those objects.

toString—returns a string representation of this collection.

An enumeration is an interface, meaning that it simply describes methods that must be present in any class that implements the interface. An object that implements the enumeration interface generates a series of elements, one at a time. The Java utility library provides an interface to capture this type of behavior. The java.util.Enumeration declares two methods: hasMoreElements and nextElement. The first of these returns a true/false value, according to whether a given enumeration is exhausted. The second method returns the next element as an Object reference. Successive calls to the nextElement method return successive elements of the series.

2.0 Enterprise Java Beans Specification

The Java 2 Enterprise Edition (J2EE) standards are evolving, and there is a need for a technique to conveniently migrate existing Java code from older implementations to support the new language specifications.

An example of this evolution is the Enterprise Java Beans (EJB) specification. The EJB specification consists of several standard Java application programming interfaces (APIs) that provide access to a core set of enterprise-class infrastructure services. Version 1.0 of EJB supports Home interface finder methods that return java.util.Enumeration. The latest version of EJB, version 1.1, has been extended to support java.util.Collection, as well as java.util.Enumeration. Rather than implement this new function twice, the software wrapper 16 provides a convenient way to support both the old and the new versions with minimal changes to the existing enumerations, developer tools and runtime code.

The EJB specification supports the use of "Beans" or software components. Components are pre-developed pieces of software code that can be assembled into working application systems. A component is a reusable software building block: a pre-built piece of encapsulated application code that can be combined with other components and with handwritten code to rapidly produce a custom application.

EJB software components execute within a construct called a container. A container provides an application context for one or more components and provides management and control services for the components. In practical terms, a container provides an operating system process or thread in which to execute the component. Client components normally execute within some type of visual container, such as a form, a compound document, or a Web page. Server components are non-visual and execute within a container that is provided by an application server, such as a Web server, or a database system.

An EJB container manages the enterprise beans that are deployed within it. Client applications do not directly interact with an enterprise bean. Instead, the client application interacts with the enterprise bean through two wrapper interfaces that are generated by the container: the EJB Home interface and the EJB Object interface. As the client invokes operations using the wrapper interfaces, the container intercepts each method call and inserts the management services.

An EJB server provides an environment that supports the execution of applications developed using EJB technology. It manages and coordinates the allocation of resources to the applications.

Without the software wrapper of the present invention, there are two scenarios where the collection extension of EJB 1.1 could be problematic. In the container managed persistence (CMP) based EJB case, without the software wrapper, there must be code to create, fill in, and return the enumeration/collection. Such code is tool and application server specific runtime code.

In the bean managed persistence (BMP) based EJB case, the end user (the EJB Bean provider) must create, fill in, and return this enumeration (and/or collection) to return back to an EJB client making use of the enumeration.

In either case, additional code for each enumeration must be developed, whether it's returning the information in an enumeration or collections format.

Software vendors that implement EJB 1.0 and EJB 1.1 have addressed this problem by providing two separate implementations of the underlying enumerations, which requires more resources with little added benefit. In the BMP case, Bean providers are required to implement their existing code twice if they want to support both APIs. The software wrapper 16 of the present invention differs in that the solution can be implemented once, and thus supported once.

This invention allows runtime developers and bean providers to develop the function once (on the java.util.Enumeration API) and support it using either java.util.Enumeration API or the newer java.util.Collection API.

The present invention can create an implementation class which inherits from both API sets. For the java.util.Enumeration APIs, the implementation of this class delegates directly to the provided java.util.Enumeration currently provided by the Bean provider or currently generated application server code. For the java.util.Collection APIs, the implementation of this class will use a semi-delegation model delegating to the enumeration APIs where necessary to retrieve elements but the internal state for the Collection is maintained in the wrapper case. Whenever objects are needed that are currently not in the internal state of the collection, a call is made on the enumeration to retrieve the next element.

While the embodiments, of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of implementing a collection program interface for accessing a collection of data associated with a legacy enumeration application program interface, the method comprising:

retrieving a first set of at least one data element from the collection of data and storing the retrieved first set of at least one data element in a vector in response to receiving an initial first call on the collection application program interface;

comparing a first positional cursor to a size of the vector in response to receiving a second call on the collection application program interface subsequent to receiving the initial first call on the collection application program interface;

retrieving a second set of at least one data element from the collection of data and storing the retrieved second set of at least one data element in the vector in response to the first positional cursor being equal to or greater than the size of the vector; and retrieving the first set of at least one data element from the vector in response to the first positional cursor being less than the size of the vector.

2. The method of claim 1, wherein the enumeration application program interface is a java-based enumeration application program interface.

3. The method of claim 2, wherein the java-based enumeration application program interface is java.util.Enumeration application program interface.

4. The method of claim 1, wherein the collection application program interface is a java-based collection application program interface.

5. The method of claim 4, wherein the java-based collection application program interface is java.util.Collection application program interface.

6. The method of claim 1, further comprising:

comparing a second positional cursor to the size of the vector in response to receiving a third call on the collection application program interface subsequent to receiving the initial first call and the second call on the collection program interface;

retrieving a third set of at least one data element from the collection of data and storing the retrieved third set of at least one data element in the vector in response to the second positional cursor being equal to or greater than the size of the vector; and retrieving the first set of at least one data element and the second set of the at least one data element from the vector in response to the second positional cursor being less than the size of the vector.

7. A system, comprising:

a processor; and a memory storing instructions operable with the processor to implement a collection program interface for accessing a collection of data associated with a legacy enumeration application program interface, the instructions being executed for:

retrieving a first set of at least one data element from the collection of data and storing the retrieved first set of at least one data element in a vector in response to receiving an initial first call on the collection application program interface;

comparing a first positional cursor to a size of the vector in response to receiving a second call on the collection application program interface subsequent to receiving the initial first call on the collection application program interface;

retrieving a second set of a least one data element from the collection of data and storing the retrieved second set of at least one data element in the vector in response to the first positional cursor being equal to or greater than the size of the vector; and retrieving the first set of a least one data element from the vector in response to the first positional cursor being less than the size of the vector.

8. The system of claim 7, wherein the enumeration application program interface is a java-based enumeration application program interface.

9. The system of claim 8, wherein the java-based enumeration application program interface is java.util.Enumeration application program interface.

10. The system of claim 7, wherein the collection application program interface is a java-based collection application program interface.

11. The system of claim 10, wherein the java-based collection application program interface is java.util.Collection application program interface.

12. The system of claim 7, wherein the instructions are further executed for:

comparing a second positional cursor to the size of the vector in response to receiving a third call on the collection application program interface subsequent to receiving the initial first call and the second call on the collection program interface;

retrieving a third set of at least one data element from the collection of data and storing the retrieved third set of at least one data element in the vector in response to the second positional cursor being equal to or greater than the size of the vector; and retrieving the first set of at least one data element and the second set of the at least one data element from the vector in response to the second positional cursor being less than the size of the vector.

13. A signal bearing medium tangibly embodying a program of machine-readable instructions executable by a processor to perform operation to implement a collection program interface for accessing a collection of data associated with a legacy enumeration application program interface, the operations comprising:

retrieving a firs set of at least one data element from the collection of data and storing the retrieved first set of at least one data element in a vector in response to receiving an initial first call on the collection application program interface;

comparing a first positional cursor to a size of the vector in response to receiving a second call on the collection application program interface subsequent to receiving the initial first call on the collection application program interface;

retrieving a second set of at least one data element from the collection of data and storing the retrieved second set of at least one data element in the vector in response to the first positional cursor being equal to or greater than the size of the vector; and retrieving the first set of at least one data element from the vector in response to the first positional cursor being less than the size of the vector.

14. The signal bearing medium of claim 13, wherein the enumeration application program interface is a java-based enumeration application program interface.

15. The signal bearing medium of claim 14, wherein the java-based enumeration application program interface is a java.util.Enumeration application program interface.

16. The signal bearing medium of claim 13, wherein the collection application program interface is a java-based collection application program interface.

17. The signal bearing medium of claim 16, wherein the java-based collection application program interface is a java.util.Collection application program interface.

18. The signal bearing medium of claim 13, wherein operations further comprise:

comparing a second positional cursor to the size of the vector in response to receiving a third call on the collection application program interface subsequent to receiving the initial first call and the second call on the collection program interface;

retrieving a third set of at least one data element from the collection of data and storing the retrieved third set of at least one data element in the vector in response to the second positional cursor being equal to or greater than the size of the vector; and retrieving the first set of at least one data element and the second set of the at least one data element from the vector in response to the second positional cursor being less than the size of the vector.

19. A system for implementing a collection program interface for accessing a collection of data associated with a legacy enumeration application program interface, the system comprising:

means for retrieving a first set of at least one data element from the collection of data and storing the retrieved first set of at least one data element in a vector in response to receiving an initial first call on the collection application program interface;

means for comparing a first positional cursor to a size of the vector in response to receiving a second call on the collection application program interface subsequent to receiving the initial first call on the collection application program interface;

means for retrieving a second set of at least one data element from the collection of data and storing the retrieved second set of at least one data element in the vector in response to the first positional cursor being equal to or greater than the size of the vector; and means far retrieving the first set of at least one data element from the vector in response to the first positional cursor being less than the size of the vector.

20. The system of claim 19, further comprising:

means for comparing a second positional cursor to the size of the vector in response to receiving a third call on the collection application program interface subsequent to receiving the initial first call and the second call on the collection program interface;

means for retrieving a third set of at least one data element from the collection of data and storing the retrieved third set of at least one data element in the vector in response to the second positional cursor being equal to or greater than the size of the vector; and means for retrieving the first set of at least one data element and the second set of the at least one data element from the vector in response to the second positional cursor being less than the size of the vector.

* * * * *